United States Patent [19]

Udagawa et al.

[11] Patent Number: 4,667,997

[45] Date of Patent: May 26, 1987

[54] GRIP DEVICE

[75] Inventors: Tsugio Udagawa; Toshio Akatsu; Yasunori Hamada, all of Ibaraki, Japan

[73] Assignee: Hitachi, Ltd., Tokyo, Japan

[21] Appl. No.: 792,284

[22] Filed: Oct. 28, 1985

[30] Foreign Application Priority Data

Oct. 31, 1984 [JP] Japan .................. 59-227738
Apr. 17, 1985 [JP] Japan .................. 60-80112

[51] Int. Cl.$^4$ ............................ B25J 15/12
[52] U.S. Cl. .................. 294/86.4; 294/99.1; 294/907; 310/332; 310/800; 901/36; 901/46
[58] Field of Search ............ 294/1.1, 86.4, 88, 93, 294/99.1, 106, 902, 906, 907; 414/729, 730, 744 A, 751; 901/30-36, 38-40, 45, 46, 50; 310/330-332, 370, 800

[56] References Cited

U.S. PATENT DOCUMENTS 3,253,853  5/1966  Loyer et al. .................. 294/88
3,726,557  4/1973  Ventre ...................... 294/86.4
3,866,966  2/1975  Skinner .................... 901/39 X

FOREIGN PATENT DOCUMENTS 208578   4/1984  German Democratic Rep. ....................... 294/86.4
862174   3/1961  United Kingdom ........ 294/86.4
863332   9/1981  U.S.S.R. .................... 901/36
867646   9/1981  U.S.S.R. .................... 294/907
867647   9/1981  U.S.S.R. .................... 294/86.4
1096098  6/1984  U.S.S.R. .................... 294/907

OTHER PUBLICATIONS

8th International Symposium on Industrial Robots, vol. 1, Band 1, Jun. 1, 1978, "Principle of a Piezo-Electric Micro Manipulator with Tactile Sensibility", by Y. Umetani, pp. 406-410.

Primary Examiner—Johnny D. Cherry
Attorney, Agent, or Firm—Antonelli, Terry & Wands

[57] ABSTRACT

In a grip device wherein bimorph type piezoelectric elements are employed for fingers or claws for grasping a workpiece, a grip device comprising bimorph type piezoelectric elements which are mounted on a grip body and which form finger or claws, a voltage feed circuit which is connected to the piezoelectric elements in order to bend and deform the piezoelectric elements, and a control circuit is connected to an end of the piezoelectric elements providing an output signal for controlling a grasping force for a workpiece.

12 Claims, 12 Drawing Figures

GRIP DEVICE

BACKGROUND OF THE INVENTION

The present invention relates to the grip device of a robot or manipulator for handling a workpiece.

A prior-art grip device installed on a robot or manipulator is of the type which grasps a workpiece with a fixed force. With the prior-art grip device, therefore, the property of the workpiece has sometimes made it difficult to exactly grasp the workpiece. In order to solve the difficulty, the measure of mounting a force sensor on the fingers of the grip device is taken. When it is intended to sensitively control the grip device relative to the workpiece, the grip device must be furnished with a large number of sensors including a pressure sensor, an ultrasonic wave sensor, etc., besides the aforementioned force sensor. Such attachment of the large number of sensors to the fingers of the grip device renders the structure of the grip device itself large and complicated, and might degrade the reliability due to the insufficient management of the sensors.

There is an example wherein the fingers of a grip device are not provided with any sensors and wherein they are constructed of bimorph type piezoelectric elements thereby to afford both a sensor function and an actuator function for a grasping operation. This example is discussed in a literature "Principle of A Piezo-Electric Micro Manipulator" by Umenani in the 8th I. S. I. R. (International Symposium on Industrial Robot) (1978). The literature reports that the generation of a grasping force of several mgf or so and the detection thereof are possible. An industrial robot, however, requires capabilities of sensitively positioning the fingers of the grip device to the workpiece as stated before and generating a great grasping force. The above grip device cannot satisfactorily demonstrate the capabilities, and cannot be applied to the industrial robot.

SUMMARY OF THE INVENTION

An object of the present invention is to provide a grip device employing bimorph type piezoelectric elements which can be sensitively positioned to a workpiece.

Another object of the present invention is to provide a grip device employing bimorph type piezoelectric elements which can be used in a clean atmosphere such as a clean room that should be free from dust.

The present invention for accomplishing the object consists, in a grip device wherein bimorph type piezoelectric elements are employed as fingers for grasping a workpiece, in a grip device comprising bimorph type piezoelectric elements which are mounted on a grip body and which form at least one pair of fingers, a voltage feed circuit which is connected to said piezoelectric elements in order to bend and deform them, and means connected to an output side end of said piezoelectric elements to control a grasping force for the workpiece on the basis of an output signal thereof, whereby said piezoelectric elements forming the fingers are permitted to perform a workpiece grasping operation and at least one sensor function without mounting any sensor.

Further, the present invention for accomplishing the object consists, in a grip device wherein bimorph type piezoelectric elements are employed as fingers for grasping a workpiece, in a grip device comprising a grip body, first bimorph type piezoelectric elements which are mounted on said grip body in opposition to each other, a claw for grasping a workpiece, which is attached to a fore end of said each first bimorph type piezoelectric element, a second bimorph type piezoelectric element which is mounted on said grip body, a claw for stabilizing the grasp of the workpiece, which is attached to a fore end of said second bimorph type piezoelectric element, a voltage feed circuit which is connected to said first and second bimorph type piezoelectric elements in order to bend and deform them, and means connected to an output side end of said second bimorph type piezoelectric element to control a grasping force for the workpiece on the basis of an output signal thereof.

Other objects, advantages and features of the present invention will become apparent from the following description of embodiments taken with reference to the drawings.

DETAILED DESCRIPTION OF THE PREFERRED EMBODIMENTS

Now, embodiments of the present invention will be described with reference to the drawings.

Figure 1:
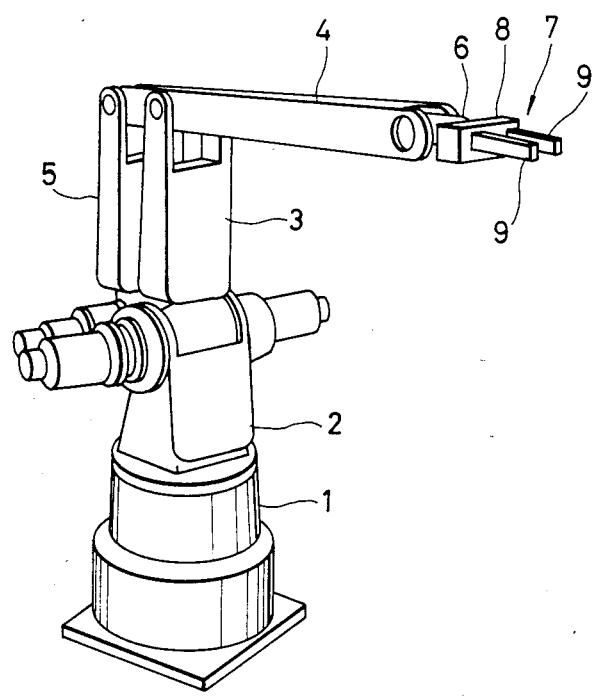
FIG. 1 is a perspective view showing an example of a robot which is furnished with an example of a grip device according to the present invention.

FIG. 1 shows an example of a robot which is furnished with an example of a grip device according to the present invention. In this figure, numeral 1 designates a base, numeral 2 a swivel body which is turnably mounted on the base 1, numeral 3 a first arm which is rotatably mounted on the swivel body 2, numeral 4 a second arm which is rotatably mounted on the first arm 3, numeral 5 an auxiliary arm, numeral 6 a wrist which is mounted on the front end of the second arm 4, and numeral 7 the grip device which is installed on the wrist 6. This grip device 7 is composed of a grip body 8 which is attached to the aforementioned wrist 6, and fingers 9 which are formed by a pair of bimorph type piezoelectric elements mounted on the grip body 8.

Figure 2:
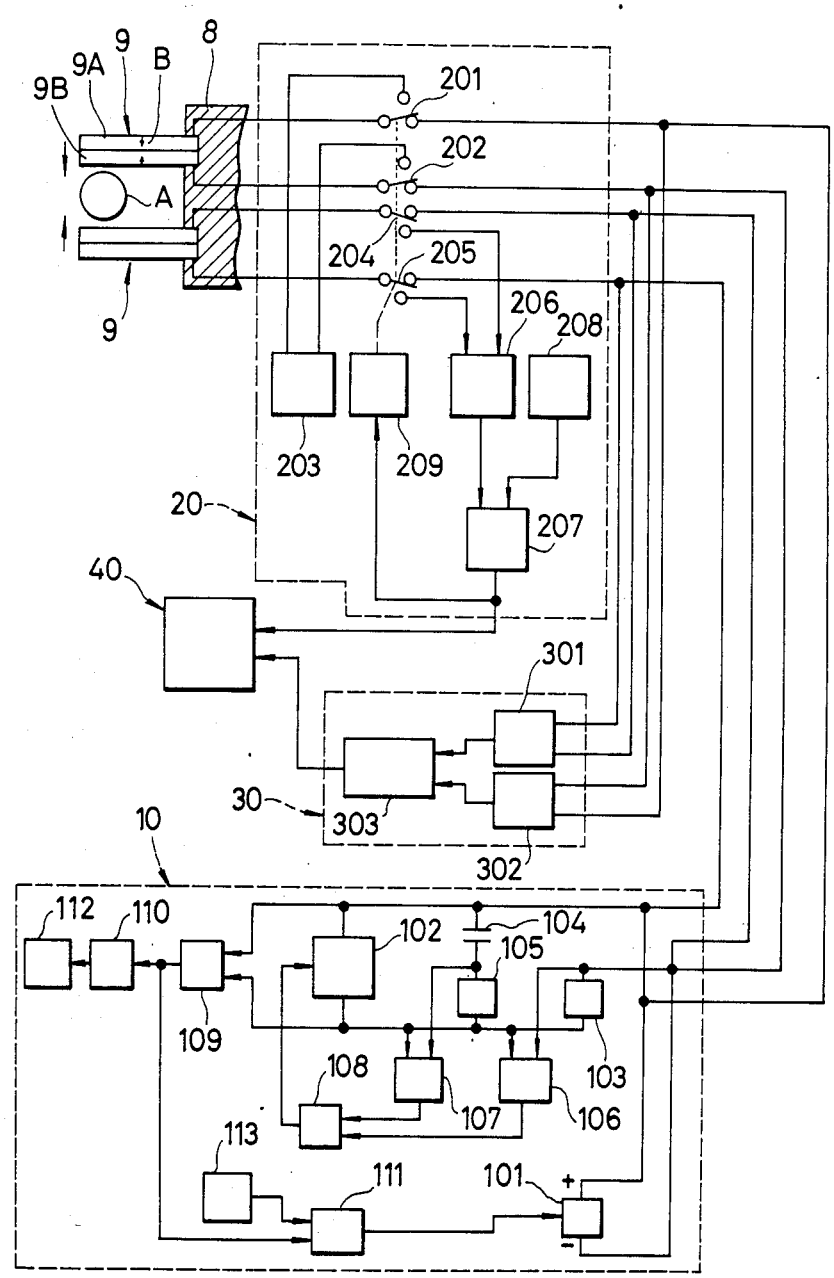
FIG. 2 is a diagram showing an example of the grip device of the present invention and a control circuit thereof.

Next, a circuit arrangement for the actuator control and sensor function of the fingers 9 formed by the pair of bimorph type piezoelectric elements will be described with reference to FIG. 2. Each of the pair of fingers 9 is constructed of two piezoelectric elements 9A and 9B which are joined so as to oppose the polarization directions (indicated by arrows B) thereof (hereinbelow, termed the 'series type'). Connected to the pair of fingers 9 are a voltage feed circuit 10 for effectuating the actuator function, a workpiece presence discriminating circuit 20 for effectuating the sensor function, and a workpiece touch detecting circuit 30. Numeral 40 in FIG. 2 designates a control circuit for the robot.

The arrangements of the above voltage feed circuit 10, workpiece presence discriminating circuit 20 and workpiece touch detecting circuit 30 will be explained in succession.

The voltage feed circuit 10 deforms the fingers 9 constructed of the bimorph type piezoelectric elements in the directions of grasping a workpiece, and controls the grasping force thereof to a set value. Numeral 101 indicates a power source unit which applies a D.C. voltage to the bimorph type piezoelectric elements 9A, 9B forming the pair of fingers 9, and the output voltage of which can be adjusted. Numeral 102 indicates a variable frequency oscillator which is connected to the bimorph type piezoelectric elements 9A, 9B of one finger 9. A frequency signal from this variable frequency oscillator 102 is applied to the bimorph type piezoelectric elements 9A, 9B of one finger in order to detect an external force acting on the finger 9. These bimorph type piezoelectric elements 9A, 9B of one finger are connected in parallel with a resistor 103. Further, they are bridge-connected to a capacitor 104 and a resistor 105, the capacitor having a capacitance which is substantially equal to the capacitance of the piezoelectric elements 9A, 9B. The resistor 103 and the resistor 105 are set at equal impedances. Rectifier circuits 106 and 107 are respectively connected across both the terminals of the resistors 103 and 105 to convert the corresponding terminal voltages into D.C. voltages. These rectifier circuits 106, 107 are connected to a differential amplifier 108. This differential amplifier 108 evaluates the difference between the output voltages from the rectifier circuits 106, 107, and controls the frequency of the variable frequency oscillator 102 so as to make the difference zero. Connected to the terminals of the variable frequency oscillator 102 is a frequency detector 109 which detects a frequency variation. The frequency variation detected by the frequency detector 109 is delivered to a function generator 110 and a comparator 111. The function generator 110 provides an acting external force W on the basis of the detected frequency variation $\Delta f$. The relationship between the frequency variation $\Delta f$ and the external force W will be described later. The external force W from the function generator 110 is displayed on a display unit 112. On the other hand, the comparator 111 controls the output voltage of the power source unit 101 on the basis of the voltage of the freguency variation from the frequency detector 109 and a reference voltage corresponding to a set grasping force from a reference voltage setting unit 113, thereby to control the grasping force of the fingers 9 to the set value.

Next, the relationship between the frequency variation $\Delta f$ and the external force W described above, in other words, the principle of force detection will be explained with reference to FIG. 3.

Figure 3:
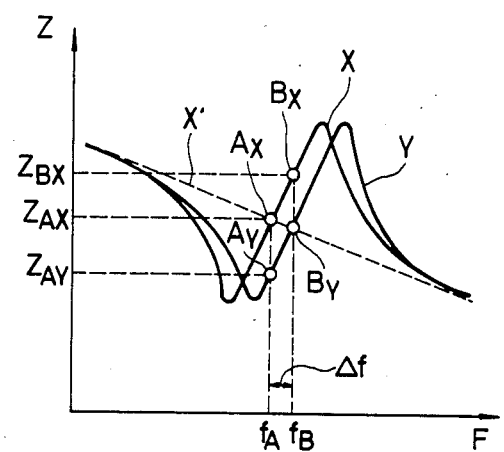
FIGS. 3 and 4 are characteristic diagrams for explaining the principle of detecting a grasping force in the present invention.
Figure 4:
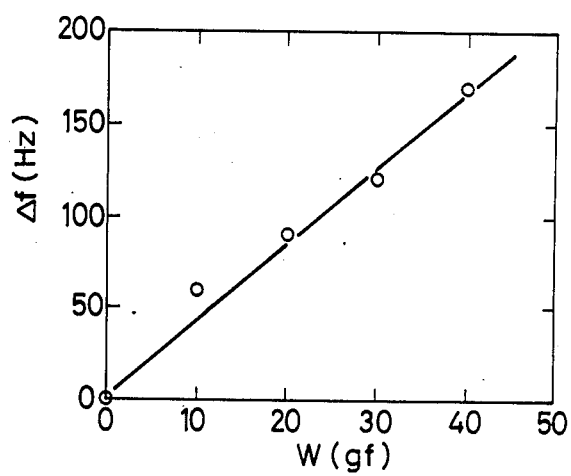

FIG. 3 shows the frequency characteristics of the bimorph type piezoelectric element for use in the present invention. In the figure, the axis of abscissas represents the frequency F, and the axis of ordinates the impedance Z of the piezoelectric element. A curve X in the figure shows the characteristic which is exhibited when no external force acts on the piezoelectric element, and a curve Y the characteristic which is exhibited when an external force acts on the piezoelectric element. Further, a straight line X' shows the frequency characteristic of a capacitor having the same capacitance as that of the piezoelectric element. Letting $\omega$ denote the angular frequency and C denote the capacitance of the capacitor, the frequency characteristic is expressed by $1/\omega C$. Accordingly, when the equivalent capacitance of the piezoelectric element is known beforehand and the capacitance C of the capacitor is selected to this value, the impedances Z agree at a point $A_X$. The impedance Z at this time is let be $Z_{AX}$, and the frequency F is let be $f_A$. When the external force W is exerted on the piezoelectric element under the state of the frequency $f_A$, the impedance Z changes in accordance with the curve Y, to a value $Z_{AY}$ corresponding to a point $A_Y$ on this curve Y. That is, the impedance Z changes from $Z_{AX}$ to $Z_{AY}$. Therefore, in a case where the frequency of the voltage to be applied to the piezoelectric element is changed so as to equalize the impedance Z of the piezoeletric element to the impedance Z set with the equivalent capacitance C, both the impedances Z agree at a point BY when this frequency has become $f_B$. The external force W acting on the piezoelectric element, namely, the grasping force, can be known by knowing the frequency change $\Delta f$ at this time. The relationship between the frequency change $\Delta f$ and the external force W has a very good linearity as shown in FIG. 4. This relationship is set in the foregoing function generator 110. According to the principle stated above, the voltage feed circuit 10 controls the grip of the pair of fingers 9 and has the function of detecting the grasping force.

Next, the work presence discriminating circuit 20 mentioned before will be described with reference to FIG. 2.

The workpiece presence discriminating circuit 20 discriminates the presence or absence of a workpiece with no contact, using one of the paired fingers 9 moved to workpiece grasping positions as an oscillating side and the other as a receiving side likewise to an ultrasonic wave sensor. To this end, a frequency oscillator 203 is connected to one finger 9 through switches 201 and 202. A voltage detector 206 is connected to the other finger 9 through switches 204 and 205. This voltage detector 206 detects a generated voltage based on the vibrations of the other finger 9 which are induced by the vibrations of one finger 9, and the detected voltage value is delivered to a discrimination circuit 207. The discrimination circuit 207 evaluates the difference $\Delta V$ between the voltage value $V_A$ from the voltage detector 206 and the induced voltage $V_O$ of the piezoelectric element for the absence of the workpiece, set in a reference voltage generator 208. Thus, it judges the presence of the workpiece between the fingers 9 when a value ($\Delta V/V_O$) obtained by dividing the difference voltage $\Delta V$ by the induced voltage $V_O$ is plus with respect to a set value, and it judges the absence of the workpiece between the fingers 9 when the value is minus. Upon judging the absence of the workpiece between the fingers 9, the discrimination circuit 207 controls a switch changer 209 to an open position and delivers, for example, a grip operation stopping command to the robot control circuit 40.

Figure 5:
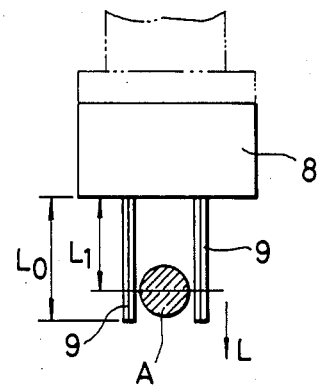
FIG. 5 is an explanatory view showing a workpiece presence detecting operation according to the grip device of the present invention.
Figure 6:
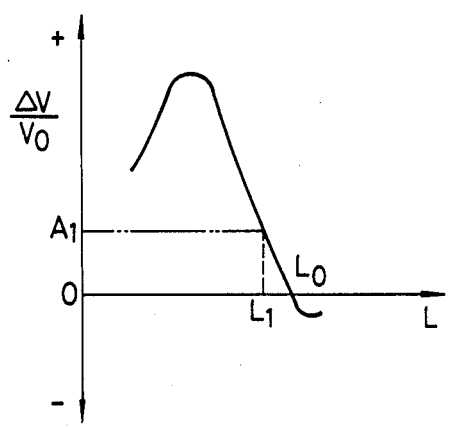
FIG. 6 is a characteristic diagram corresponding to FIG. 5.

The principle of discriminating the presence or absence of the workpiece stated above will be elucidated with reference to FIGS. 5 and 6.

Now, when the workpiece A is situated between the fingers 9 as shown in FIG. 5 and it is moved from the base parts of the fingers 9 toward the distal ends thereof, the relationship between the movement distance L of the workpiece A along the fingers 9 and the voltage ratio $\Delta V/V_O$ becomes a characteristic illustrated in FIG. 6. In the figure, the $\Delta V/V_O$ value corresponding to a position $L_1$ at which the fingers 9 can reliably grasp the workpiece A becomes $A_1$, so that the value $A_1$ is set as the reference voltage set value of the discrimination circuit 207. Thus, when the value $\Delta V/V_O$ is on the plus side with respect to the set value, the presence of the workpiece A between the fingers 9 can be discriminated, and when it is on the minus side, the absence of the workpiece A between the fingers 9 can be discriminated in non-contacting fashion.

Next, the workpiece touch detecting circuit 30 mentioned before will be described with reference to FIG. 2.

The workpiece touch detecting circuit 30 senses that the fingers 9 have touched the workpiece. Pulse detectors 301 and 302 are respectively connected to the fingers 9 to detect pulsative voltage changes which arise when the fingers 9 have touched the workpiece. These pulse detectors 301 and 302 are connected to a direction discriminating circuit 303 which discriminates the moving direction of the arm of the robot. In accordance with a detection signal from the pulse detector 301 or the pulse detector 302, the direction discriminating circuit 303 supplies the robot control circuit 40 with a signal of the moving direction of the robot arm relative to the workpiece in order to accurately position the finger 9 to the workpiece. Thus, the robot control circuit 40 operates to control the arm of the robot so as to accurately position the finger 9 to the workpiece.

Next, the operation of the foregoing grip device of the present invention will be described.

First, the arms of the robot are controlled by the control circuit 40 of the robot until the fingers 9 constructed of the piezoelectric elements are positioned to a position corresponding to the workpiece. In the workpiece presence discriminating circuit 20 shown in FIG. 2, the switches 201-205 are changed by the switch changer 209, and the frequency from the frequency oscillator 203 is applied to one finger 9 to vibrate this finger 9. The vibrations of this finger 9 propagate in the air, and vibrate the other finger 9. Thus, a voltage is generated across the terminals of the other finger 9 by the vibrations. The voltage is detected by the voltage detector 206, and is input to the discrimination circuit 207. On the basis of the characteristic shown in FIG. 6, in a case where the $\Delta V/V_O$ value is on the plus side with respect to the set value $A_1$, the discrimination circuit 207 discriminates the existence of the workpiece A between the fingers 9. In a case where it is on the minus side, the circuit 207 discriminates the nonexistence of the workpiece A between the fingers 9 and supplies the robot control circuit 40 with a robot operation stopping command or a grip operation stopping command.

Upon discriminating that the workpiece A exists between the fingers 9, the discrimination circuit 20 controls the changer 209 to change the switches 201-205 to their original positons.

Subsequently, a voltage is applied to one finger 9 by the voltage feed circuit 10, to bend and deform the fingers 9 inwards relative to each other and to start a grasping operation. At this time, the fingers 9 undergo bending deformations with minute vibrations based on the frequency from the variable frequency oscilator 102.

When, owing to the bending deformations of the fingers 9, one finger 9 has touched the workpiece A in advance of the other finger 9, a pulsative voltage change arises across the terminals of one finger 9. The pulsative voltage change is detected by the pulse detector 301 or 302 of the workpiece touch detecting circuit 30. In accordance with the detection signal, the direction discriminating circuit 303 supplies the robot control circuit 40 with information on the relative positional relationship between the pair of fingers 9 and the workpiece A. Thus, the robot control circuit 40 controls the fingers 9 on the basis of known information such as the widthwise dimension between the pair of fingers 9, so that the workpiece A is positioned between the fingers 9, while the fingers 9 can reliably grasp the workpiece A owing to the grip control circuit 10.

As stated above, according to the embodiment of the present invention, even in a case where the workpiece deviates from a predetermined position or where the grip portion deviates relative to the workpiece, the workpiece can be exactly positioned and grasped. More in detail, the fingers constructed of the piezoelectric elements are not furnished with any sensors, and the operation circuits and the sensor function circuits are switched in sequence, whereby for example, the grasping operation being the actuator function and a single operation selected from or a composite operation combining the detection of a grasping force, the non-contacting detection of the presence or absence of the workpiece and the adjustment of the relative position between the fingers and the workpiece, being the sensor functions, become possible, and a safe and highly reliable grasping operation can be performed. With the present invention, it has been confirmed that a grasping force of 80 gf can be attained in a case where the fingers 9 are constructed of piezoelectric elements 20 mm long, 7 mm wide and 0.5 mm thick.

Figure 7:
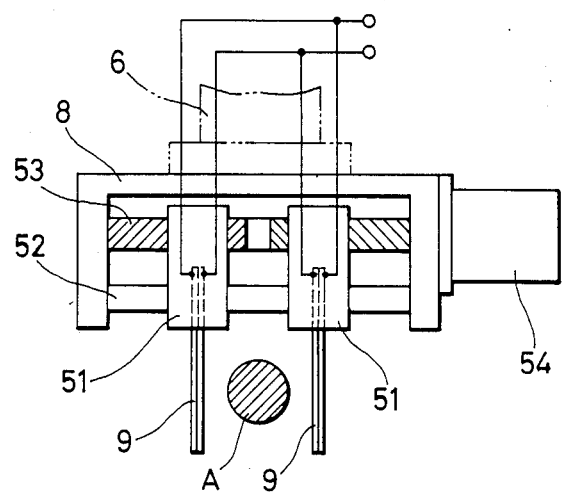
FIG. 7 is a plan view showing another example of the grip device of the present invention.
Figure 8:
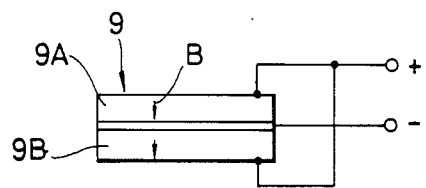
FIG. 8 is a view showing another example of a bimorph type piezoelectric element which constitutes the grip device of the present invention.

While the foregoing embodiment has fixed the grasping interval of the pair of fingers 9, an arrangement is also possible wherein, as shown in FIG. 7, two fingers 9 formed by piezoelectric elements are respectively mounted on holders 51, the holders 51 are held in engagement with a guide shaft 52 and a threaded shaft 53 disposed in a grip body 8, a motor 54 is connected to the threaded shaft 53, and the interval of the pair of fingers 9 can be varied by the rotation of the motor 54. With this arrangement, various workpieces can be grasped. Moreover, the piezoelectric elements forming the pair of fingers 9 may well be arranged in the so-called parallel type in which they are joined with their polarization directions held identical as illustrated in FIG. 8. It is also possible to dispose a plurality of pairs of fingers 9.

According to the foregoing embodiments of the present invention, a grip portion can be sensitively positioned, and the workpiece can be exactly grasped.

Figure 9:
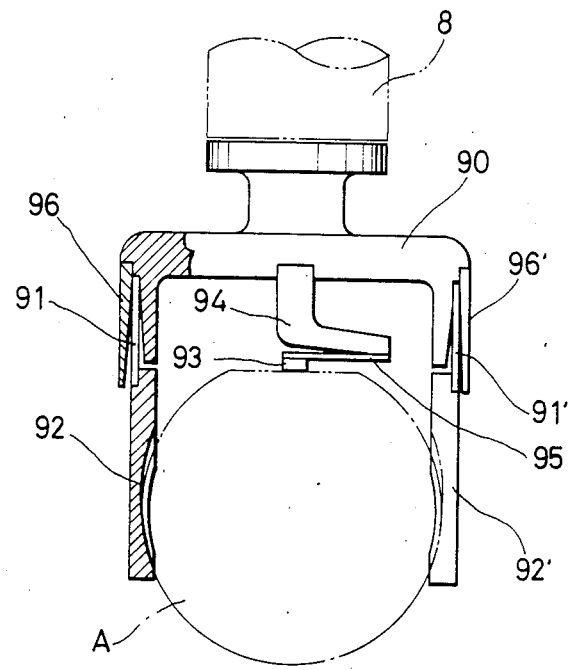
FIG. 9 is a front view, partly in section, showing still another example of the grip device of the present invention.

FIG. 9 shows still another embodiment of the grip device of the present invention. Referring to the figure, each of the bimorph type piezoelectric elements 91 and 91' has one end thereof fixed to a grip body 90. Grip claws 92 and 92' for grasping a workpiece A are attached to the other ends of the respective piezoelectric elements 91 and 91'. In addition, the grip body 90 is provided with a grip stablizing claw 93. This claw 93 is driven by a bimorph type piezoelectric element 95, one end of which is fixed by a support 94.

The grip device of the present invention thus constructed is mounted on the front end of the wrist 6 of a robot, and performs the grasping operation in cooperation with the operation of the robot proper. Numerals 96 and 96' designate covers, which are intended to protect the bimorph type piezoelectric elements 91 and 91'.

Figure 10:
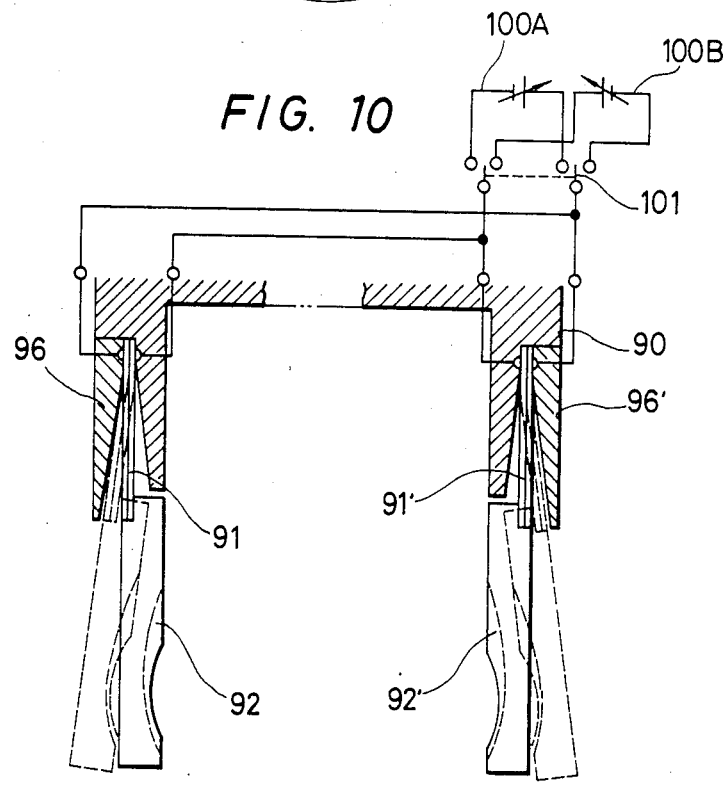
FIG. 10 is a view showing grasping claws which constitute another example of the device of the present invention shown in FIG. 9, and an example of a drive circuit thereof.

FIG. 10 shows an example of a driver circuit for grip claws 92 and 92' which constitute another embodiment of the grip device of the present invention shown in FIG. 9. Referring to FIG. 10, two D.C. voltage sources 100A and 100B are connected to bimorph type piezoelectric elements 91 and 91' through switches 101. Since, owing to such an arrangement, voltages of opposite polarities can be applied to the respective piezoelectric elements 91 and 91', these piezoelectric elements 91 and 91' displace the grip claws 92 and 92' in the direction of nipping a workpiece A or in the direction of releasing it. In a case where no voltage is externally applied to the piezoelectric elements 91 and 91', no deformation arises. Further, the grasping operation of the aforementioned grip claws 92 and 92' will be described. In a case where no voltage is applied to the terminals of the bimorph type piezoelectric elements 91 and 91', the grip claws 92 and 92' are in states indicated by solid lines. In a case where voltages are applied to the terminals, the grip claws are displaced as indicated by broken lines. When the polarities of the applied voltages are opposite, also the displacements of the grip claws 92 and 92' become opposite in direction. In case of nipping the workpiece A, accordingly, the grip claws 92 and 92' are moved to a workpiece grasping position in the states of the broken lines in FIG. 10, and the polarities of the applied voltages are thereafter reversed, whereby the workpiece A can be grasped.

Figure 11:
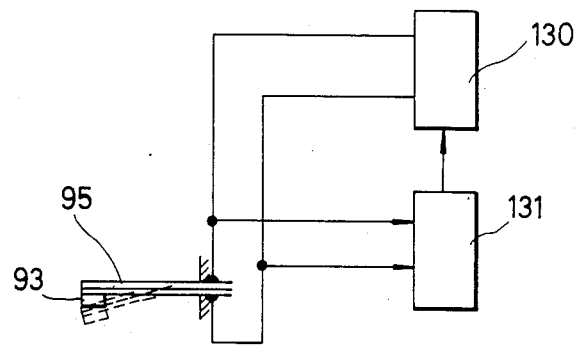
FIG. 11 is a view showing a grasp stabilizing claw which constitutes the device of the present invention shown in FIG. 9, and an example of a drive circuit thereof.

FIG. 11 shows an example of a driver circuit for a grip stablizing claw 93 which is used for still another embodiment of the device of the present invention shown in FIG. 9. Referring to FIG. 11, the grip stablizing claw 93 operates so as to depress or release a workpiece A, depending upon the polarity of a voltage which is applied to a bimorph type piezoelectric element 95. This bimorph type piezoelectric element 95 has a sensor function for detecting a grasping force, and controls the grasping force of the workpiece A. More specifically, a driver circuit composed of a power source circuit 130 for directly affording a deformation and a force detection circuit 131 for detecting a pressing force is connected to the bimorph type piezoelectric element 95. The force detection circuit 131 detects the pressing force acting on the bimorph type piezoelectric element 95 and inputs the result to the power source circuit 130 so as to adjust the output voltage of the power source circuit 130, thereby to regulate the magnitude of deformation of the bimorph type piezoelectric element 95. Thus, a required pressing force can be attained.

The force detection in the force detection circuit 131 is carried out according to the same principle as illustrated in FIG. 3, and shall not be repeatedly explained.

Figure 12:
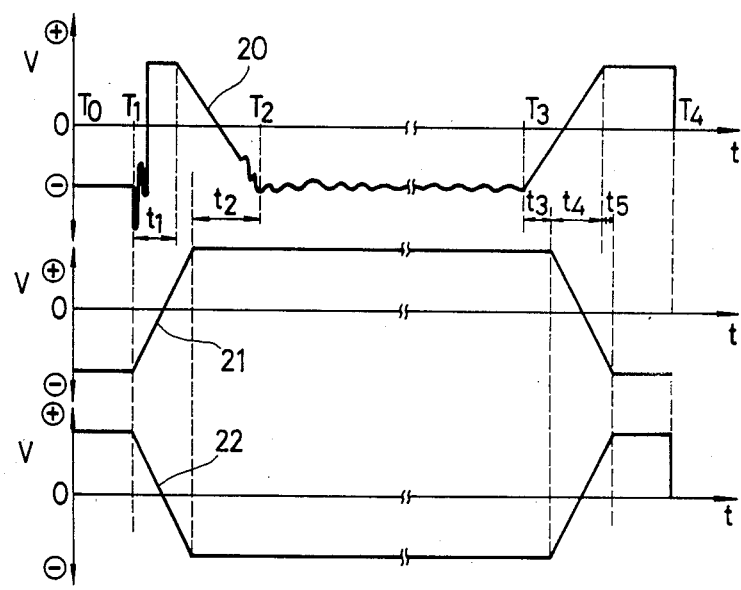
FIG. 12 is a diagram for explaining the situation of voltages which are applied to respective bimorph type piezoelectric elements to serve as the driving sources of corresponding claws in the device of the present invention shown in FIG. 9.

FIG. 12 shows the movements of the claws 92, 92' and 93 constituting the device of the present invention shown in FIG. 9, in other words, the changes of the voltages applied to the respective bimorph type piezoelectric elements 91, 91' and 95, and the illustration is given as an example of an actual workpiece grasping operation. In the figure, the axis of ordinates represents the voltage V, and the axis of abscissas the time t. A curve 20 indicates the voltage variation of the claw 93, and curves 21 and 22 indicate the circumstances of the voltage variations of the claws 91 and 91' which nip the workpiece A directly.

In a case where a robot arm 4 is operated to bring the grip claws 92 and 92' close to the workpiece A, the polarities of voltages applied to the bimorph type piezoelectric elements 91 and 91' which operate the claws 92 and 92' for nipping the workpiece A are opposite to each other, so that the interval between these claws is wide. Meanwhile, the bimorph type piezoelectric element 95 for driving the claw 93 is supplied with a voltage with which this claw is deformed to the side of the workpiece A. When the grip device has approached the workpiece A, the claw 93 touches the workpiece A first and the voltage changes at that point of time $T_1$. From the point of time $T_1$, the voltages applied to the bimorph type piezoelectric element 91 for operating the claw 92 and the bimorph type piezoelectric element 91' for driving the claw 92' are respectively changed into the opposite directions, while at the same time the voltage applied to the bimorph type piezoelectric element 95 for driving the claw 93 is changed to the opposite polarity. Under this state, the workpiece A is nipped. The gradual inversion of the polarities of the voltages applied to the claws 92 and 92' is for the prevention of damages in the case where the workpiece A is fragile, and it can be suitably adjusted depending upon the properties of the workpiece A.

After the workpiece A has been nipped by the claws 92 and 92', a D.C. voltage with alternating current superposed thereon is applied to the bimorph type piezoelectric element 95 for driving the claw 93, to reliably hold the workpiece A from a point of time $T_2$, while at the same time the force detection is executed so as to establish a predetermined pressing force. Subsequently, the robot arm 4 performs a predetermined operation. Thereafter, the workpiece A is released. The release can be realized by applying voltages reversely to those in the case of grasping the workpiece.

Since the deformations of the bimorph type piezoelectric elements 91 and 91' are limited, the dimensions of the workpiece A to be grasped are also subject to limitations. Therefore, the grip mechanism may well be furnished with means by which the interval of the claws 92 and 92' for nipping the workpiece A can be changed continuously or stepwise to fixed lengths.

While, in the above embodiment, the detection of the pressing force has been applied to the control of the operation of the claw 93, it may well be simultaneously applied to the adjustment of the workpiece grasping force owing to the claws 92 and 92'.

According to the foregoing embodiment of the present invention, the structure of a slide portion forming a dust source is not included, so that a grip device free from dust which is suitable for use in a clean atmosphere such as clean room can be provided. Moreover, since a grasping force can be controlled by a force detecting mechanism, the reliable grip of a workpiece is possible and the damage thereof can be prevented. Besides, the grip device is simple in mechanism and is light in weight.

What is claimed is:

1. In a grip device wherein bimorph type piezoelectric elements are employed for gripping means for grasping a workpiece, a grip device comprising:
   a grip body,
   bimorph type piezoelectric elements which are mounted on said grip body and which form at least one pair of gripping means,
   a voltage feed circuit which is connected to said piezoelectric elements in order to bend and deform said piezoelectric elements,
   grasping force control means connected to an end of said piezoelectric elements and providing an output signal to said piezoelectric elements for controlling a grasping force for a workpiece, said grasping force control means including a frequency detector which detects a frequency variation applied from a bridge circuit having one of said bimorph type piezoelectric elements and a capacitor connected thereto, and a function generator which evaluates the grasping force on the basis of frequency variation from said frequency detector, said frequency detector providing said frequency variation to said voltage feed circuit, and
   a workpiece presence discriminating circuit connected to said piezoelectric element and including a frequency oscillator which is connected to said one of said piezoelectric elements so as to vibrate said one of said piezoelectric elements, a voltage detector which detects a voltage caused by induced vibrations of the other of said piezoelectric elements, and a discrimination circuit which decides absence of the workpiece when the voltage from said voltage detector is minus with respect to a set value.

2. A grip device according to claim 1, comprising a touch detecting circuit including pulse voltage detectors which are respectively connected to said piezoelectric elements and which detect pulsative voltage changes induced by contact between said piezoelectric elements and the workpiece, and a discrimination circuit which discriminates a relative postional relationship between the workpiece and the at least one pair of gripping means on the basis of a pulse voltage signal from said each pulse voltage detector.

3. A grip device according to claim 2, wherein said gripping means include finger members.

4. A grip device according to claim 2, wherein said gripping means include claw members.

5. A grip device according to claim 4, wherein said claw members include a claw member for stabilizing the grasp of the workpiece.

6. A grip device according to claim 1, wherein said gripping means include finger members.

7. A grip device according to claim 1, wherein said gripping means include claw members.

8. A grip device according to claim 7, wherein said claw members include a claw member for stabilizing the grasp of the workpiece.

9. In a grip device wherein bimorph type piezoelectric elements are employed for gripping means for grasping a workpiece, a grip device comprising:
   a grip body,
   bimorph type piezoelectric elements which are mounted on said grip body and which form at least one pair of gripping means,
   a voltage feed circuit which is connected to said piezoelectric elements in order to bend and deform said piezoelectric elements,
   grasping force control means connected to an end of said piezoelectric elements and providing an output signal to said piezoelectric elements for controlling a grasping force for a workpiece, said grasping force control means including a frequency detector which detects a frequency variation applied from a bridge circuit having one of said bimorph type piezoelectric elements and a capacitor connected thereto, and a function generator which evaluates the grasping force on the basis of the frequency variation from said frequency detector, said frequency detector providing said frequency variation to said voltage feed circuit, and
   a touch detecting circuit including pulse voltage detectors which are respectively connected to said piezoelectric elements and which detect pulsative voltage changes induced by contact between said piezoelectric elements and the work piece, and a discrimination circuit which discriminates a relative positional relationship between the work piece and the at least one pair of gripping means on the basis of a pulse voltage signal from each pulse voltage detector.

10. A grip device according to claim 9, wherein said gripping means include finger members.

11. A grip device according to claim 9, wherein said gripping means include claw members.

12. A grip device according to claim 11, wherein said claw members include a claw member for stabilizing the grasp of the workpiece.

* * * * *